Figure 1:
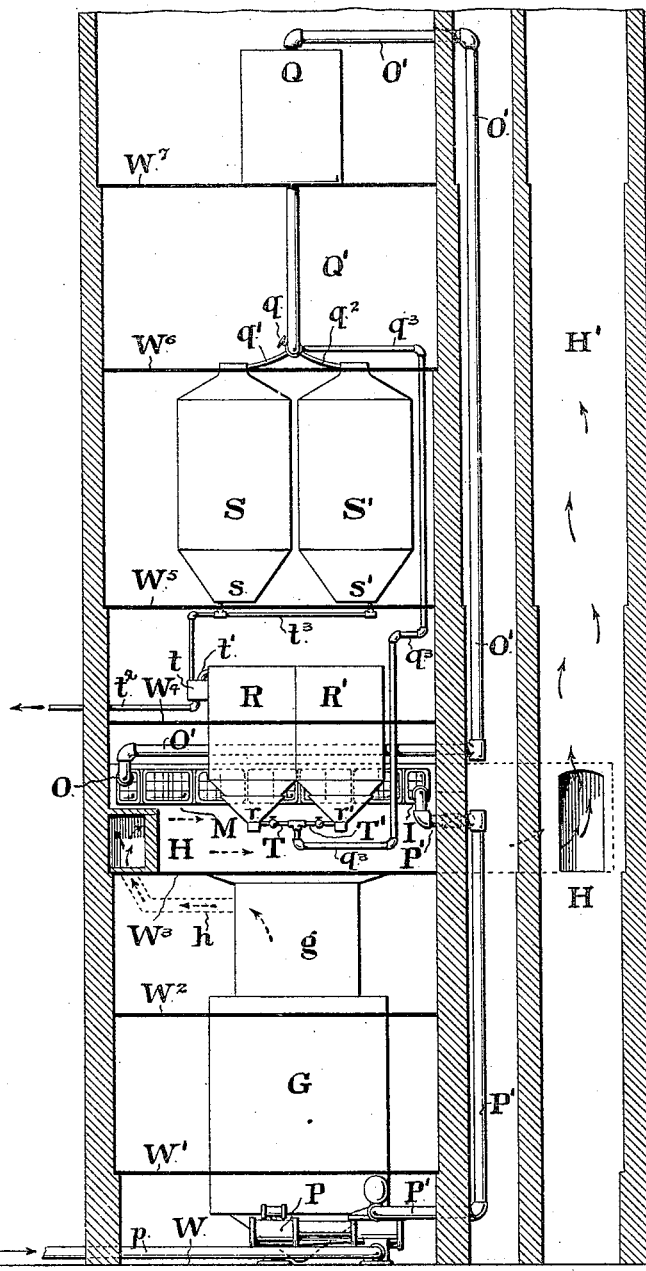

(No Model.) 2 Sheets—Sheet 1.

C. SPRECKELS.
APPARATUS FOR HEATING WATER IN SUGAR REFINERIES.

No. 529,469. Patented Nov. 20, 1894.

WITNESSES: INVENTOR:

(No Model.) 2 Sheets—Sheet 2.
C. SPRECKELS.
APPARATUS FOR HEATING WATER IN SUGAR REFINERIES.
No. 529,469. Patented Nov. 20, 1894.
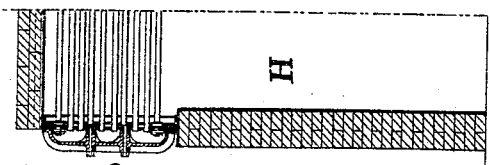
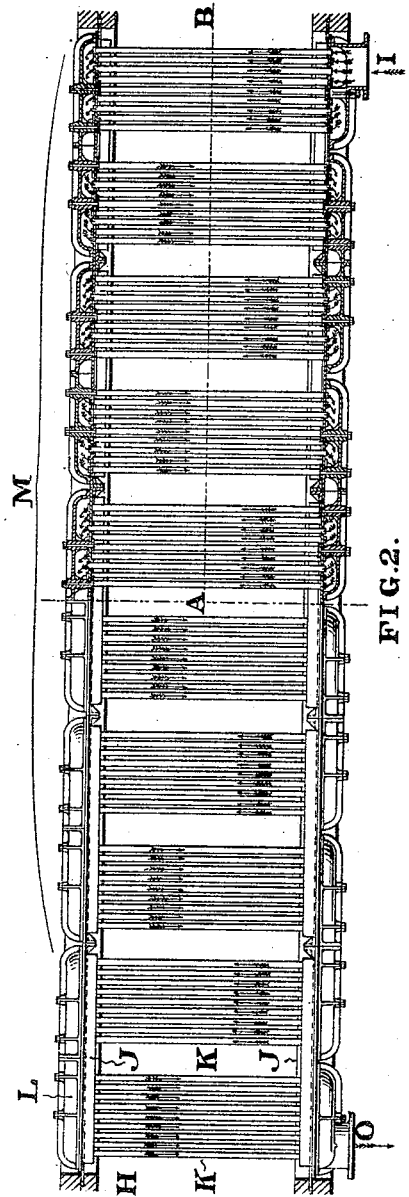
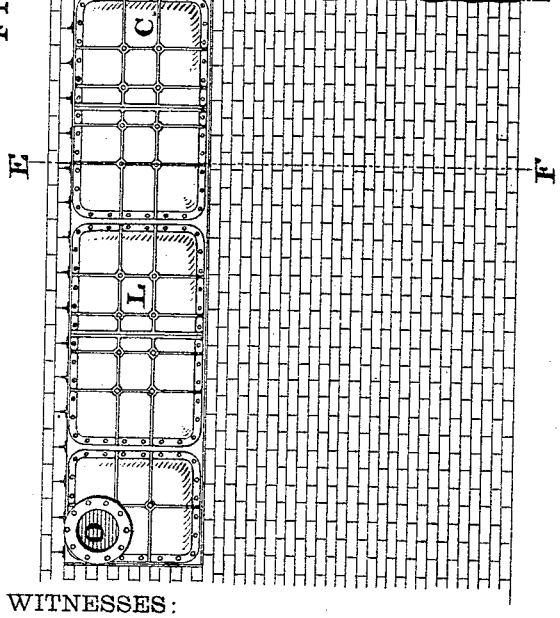
WITNESSES: INVENTOR

UNITED STATES PATENT OFFICE.

CLAUS SPRECKELS, OF PHILADELPHIA, PENNSYLVANIA.

APPARATUS FOR HEATING WATER IN SUGAR-REFINERIES.

SPECIFICATION forming part of Letters Patent No. 529,469, dated November 20, 1894.

Application filed February 10, 1892. Serial No. 421,028. (No model.)

*To all whom it may concern:*

Be it known that I, CLAUS SPRECKELS, a citizen of the United States, now residing at Philadelphia, in the State of Pennsylvania, have invented a certain new and useful Apparatus for Heating Water in Sugar-Refineries, whereof the following is a specification, reference being had to the accompanying drawings.

In the operation of sugar refineries, very large quantities of hot water are constantly required for the purpose of washing the bone-black or "char" after the filtering operation, in order to cleanse the same and remove the saccharine matter therefrom preparatory to the revivifying treatment in the char-kilns. To heat this water to the necessary temperature it has been customary to use a large amount of live or exhaust steam whereby the water is raised to or near the boiling point. As an adjunct to such method of heating, apparatus have been employed whereby the water which had been used for washing the bone-black, and still retaining a portion of its heat, was caused to impart heat to fresh water on its way to the steam heating apparatus. Such auxiliary heating of the water of course failed to raise it to the necessary temperature, and merely warmed it preparatory to the operation of the main heating devices.

The object of my invention is to utilize the heat contained in the escaping gases driven off from the char kilns during the revivifying operation, and by my apparatus I am enabled to raise the temperature of the water to substantially the point necessary for washing the bone-black, thus practically avoiding the necessity for auxiliary heating devices, and effecting great economy of steam and fuel. To this end I place, preferably in the main flue which intervenes between the several kiln flues and the chimney, a heating apparatus adapted for water circulation, and of such character as to expose a maximum heating surface to the action of the out-going gases in said flues.

In the accompanying drawings, Figure 1 represents diagrammatically a system of apparatus embodying my invention, the main features of the system being indicated by a general vertical section through the several stories of a refinery, without, however, detailed representation of the various parts. Figs. 2, 3, and 4, are detail views, on a much enlarged scale, showing the construction and arrangement of the water heating apparatus itself. Fig. 2 is partly a plan view and partly a sectional view on a horizontal plane (on line C D of Fig. 3) of the interior of the main flue containing said apparatus. Fig. 3 is partly a side elevation of the exterior of said flue and apparatus, and partly a longitudinal section on a vertical plane (on the line A B of Fig. 2) of the apparatus and the flue. Fig. 4 is a partial vertical, transverse section, on the line E F of Fig. 3.

Referring to the general view of Fig. 1, W, W', $W^2$, $W^3$, $W^4$, $W^5$, $W^6$ and $W^7$, inclusive, represent the several floors of a sugar refinery.

G represents one of a series of char-kilns, provided above with the usual drier, g. The flue, h, from said kiln leads into the main flue, H, which in turn leads to the chimney H'. Within said flue, H, is placed the water heating apparatus, M, shown in detail in Figs. 2 to 4, inclusive, said apparatus being preferably placed along the whole upper portion of the flue. It is constructed as follows: A series of steel tube-plates, J, are mounted in each wall of the flue, arranged in pairs opposite to one another, and copper tubes, K, are expanded into the holes of said plates, said tubes extending across the flue from side to side in groups, as shown. Upon the outer faces of the tube-plates, J, are fitted hollow backs, L, alternately arranged upon the opposite sides, as shown clearly in Fig. 2, so as to form a series of water-tight chambers in the flue walls, communicating in an alternating manner by means of the several groups of tubes and constituting a continuous channel, alternating from side to side, from one end of the flue to the other. Suitable braces and tie-rods are of course provided to properly stay the tube-plates and backs. At that end of the flue which is nearest to the chimney (and consequently farthest from the opening of the kiln flue) an inlet nozzle, I, is provided whereby water is admitted to the first chamber of the series, and an outlet, O, is provided at the other end of the apparatus, from which the water, after circulating in the course indicated by the arrows, is discharged.

The water circulation is maintained as follows: On the floor, W, is a pump, P, having an inlet pipe, $p$, and a delivery pipe, P', which leads upward, as shown, and communicates with the water heating apparatus at the inlet I. A discharge pipe, O', leads from the outlet, O, and thence preferably to the top of the building, where it discharges into a hot water reservoir, Q. The bone-black filters are indicated at S, and S', each of them being preferably provided with a hopper shaped outlet $s$, and $s'$, at the bottom to discharge their contents into the subjacent wash tanks R, R', which in turn have hopper shaped outlets $r$ and $r'$ at the bottom discharging into the drier $g$.

From the hot water reservoir, Q, an exit pipe, Q', leads down, communicating by branches, $q'$, $q^2$, with the filters, S and S', and by a third branch, $q^3$, with the pipes, T and T', leading into the bottom of the wash tanks, R, R', respectively. Suitable valves, arranged for instance at $q$, control the delivery of the water from the pipe, Q', to the respective branch pipes. An overflow chamber, $t$, is provided adjacent to the wash tanks, and from their top an overflow pipe, $t'$, leads to said chamber; an outlet pipe, $t^2$, leading therefrom to the waste main. An outlet pipe, $t^3$, communicating with the filters, S and S', also discharges into said overflow chamber, $t$.

The operation of the device is as follows: Assuming that a charge of bone-black is within the kiln, G, undergoing the heating process for revivification, the hot gases pass off through the kiln flue, $h$, into the main flue, H, and thence to the chimney, H'. The pump, P, being actuated, a constant stream of water is forced through the heating apparatus, M, and in its alternating and tortuous course from end to end of the flue, takes up a very large portion of the heat of said gases, the temperature of the water being thereby raised to or near the boiling point. The cold water is admitted at the point farthest from the kiln, so that the gases in their hottest state act upon the water after its temperature has been raised by passage through the preceding portions of the channel, thus obtaining a maximum heating effect. On emerging at the outlet, O, the hot water rises through the pipe, O', to the reservoir, Q, and thence descends through the exit pipe, Q', to the desired point. In normal operation it is first admitted to the filters, S, S', in order to wash them, as well as to saturate the bone-black therein, which at the proper time is discharged from the hopper shaped outlets, $s$, $s'$, into the subjacent wash tanks, R, R'. There the water is forced upward through it from the inlet pipes, T, T', at the bottom, and the washings rise up and pass out by the overflow pipe, $t'$. When the bone-black is sufficiently cleansed, the hot water is shut off from the wash tanks, and the contents thereof, after draining, are discharged into the drier, $g$, passing thence into the kiln, G.

It will be understood that as this system is embodied in a refinery, the use of groups of kilns, and filters, and char-wash tanks, (in which the several operations are going on simultaneously, but in different stages,) with a water heating apparatus common to all, renders the operation practically a continuous one.

Having thus described my invention, I claim—

The hereinbefore described system of apparatus for heating the wash water for the char-wash tanks, &c., and of utilizing the waste heat from the char-kilns, which consists of the following devices arranged in combination: a char kiln; a flue connected therewith; a water circulating channel arranged in said flue; a water forcing device communicating with said channel; a filter; a subjacent char wash tank; pipes whereby said heated wash water may be led into said filter and tank; and an overflow outlet pipe, substantially as set forth.

CLAUS SPRECKELS.

Witnesses:
JAMES H. BELL,
G. HERBERT JENKINS.